United States Patent [19]

Sumida et al.

[11] Patent Number: 5,568,025
[45] Date of Patent: Oct. 22, 1996

[54] ABNORMALLY DETECTING DEVICE FOR RELAY

[75] Inventors: Yoshitaka Sumida, Yokkaichi; Shinichiro Takahashi, Osaka, both of Japan

[73] Assignee: Sumitomo Wiring Systems, Ltd., Japan

[21] Appl. No.: 329,254

[22] Filed: Oct. 26, 1994

[30] Foreign Application Priority Data

Nov. 2, 1993 [JP] Japan .................. 5-063607 U

[51] Int. Cl.⁶ .................................. H02P 1/00
[52] U.S. Cl. ................. 318/287; 318/280; 318/254; 318/138; 318/439; 318/434; 361/21; 361/30; 361/31
[58] Field of Search .................. 318/254, 138, 318/439, 434, 299, 362, 365, 280–287, 445, 450, 471, 472; 335/18, 68; 361/30, 31, 21

[56] References Cited

U.S. PATENT DOCUMENTS

| | | | |
|---|---|---|---|
| 4,145,641 | 3/1979 | Ozaki | 318/299 X |
| 4,300,085 | 11/1981 | Monma et al. | 318/696 |
| 4,972,129 | 11/1990 | Kawai et al. | 318/286 X |
| 5,012,165 | 4/1991 | Lautzenhiser et al. | 318/365 X |
| 5,065,079 | 11/1991 | Ogasawara | 318/280 X |
| 5,136,221 | 8/1992 | Takizawa et al. | 318/471 X |
| 5,160,875 | 11/1992 | Kono | 318/287 X |
| 5,229,695 | 7/1993 | Tsuda et al. | 318/434 |

FOREIGN PATENT DOCUMENTS

| | | | |
|---|---|---|---|
| 362496 | 4/1990 | European Pat. Off. | H02H 7/08 |
| 148529 | 6/1990 | Japan | H01H 47/00 |

Primary Examiner—William M. Shoop, Jr.
Assistant Examiner—Karen Masih
Attorney, Agent, or Firm—Jordan B. Bierman; Bierman and Muserlian

[57] ABSTRACT

There is disclosed a device for detecting an abnormality in relays which is adapted such that if there is a current flow through a motor (M) when first and second transistors (Q1, Q2) are off resulting from an abnormality such as melting of first and second motor driving relays (RL1, RL2), a controller (1) turns on the transistors (Q1, Q2) of a motor driving portion (2) in response to a detection signal from a signal detecting portion (3) and accordingly provides the same potential across the motor (M) to stop the motor (M) without a conventionally complicated, costly construction.

7 Claims, 7 Drawing Sheets

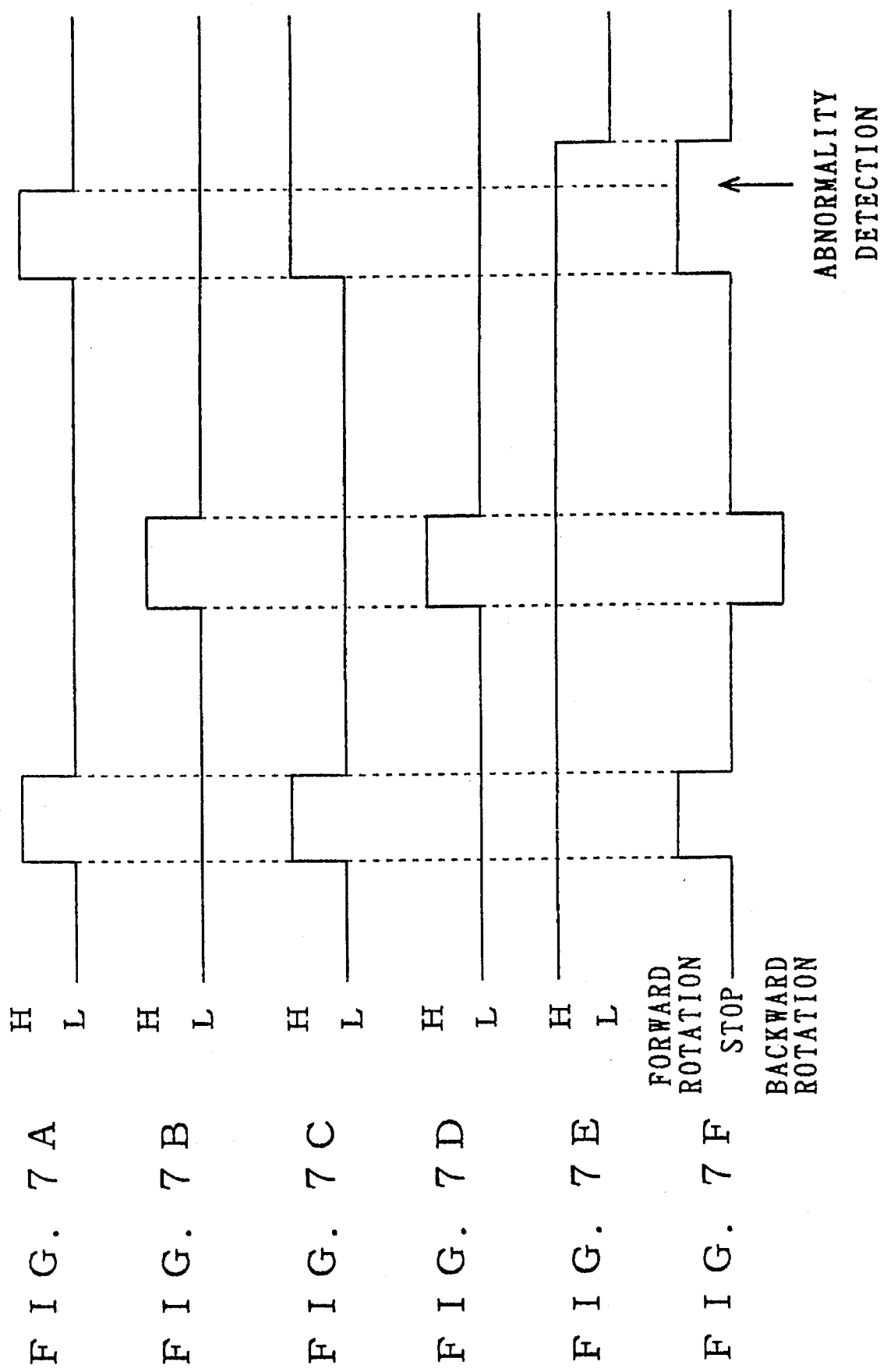

ABNORMALLY DETECTING DEVICE FOR RELAY

BACKGROUND OF THE INVENTION

1. Field of the Invention

The present invention relates to a relay abnormality detecting device for detecting an abnormality in relays for driving a motor such as an automotive door lock motor, an automotive power window motor, and an automotive sun roof motor.

2. Description of the Prior Art

In the past, forward and backward rotations of a motor such as an automotive door lock motor have been controlled by a circuit as shown in FIG. 5, for example.

Referring to FIG. 5, when a forward or backward rotation command is applied to a controller 1 including an ECU by actuation of an input portion SW including a switch, a switching control signal output terminal O1 or O2 of the controller 1 outputs a high-level (referred to as "H" hereinafter) switching control signal to a base of an first NPN transistor Q1 serving as a switching element for forward rotation or to a base of a second NPN transistor Q2 serving as a switching element for backward rotation, to turn on the transistor Q1 or Q2. When the transistor Q1 turns on, current flows from a battery +B serving as a power supply through a fuse F2 to a relay coil C1 of a first motor driving relay RL1 to excite the relay coil C1. Then a c-contact T1 of the first relay RL1 is switched from a normally-closed terminal to a normally-open terminal. Likewise, when the transistor Q2 turns on, current flows from the battery +B through the fuse F2 to a relay coil C2 of a second motor driving relay RL2 to excite the relay coil C2. Then a c-contact T2 of the second relay RL2 is switched from a normally-closed terminal to a normally-open terminal.

At this time, a motor driving portion 2 for driving a motor M is formed by the transistors Q1, Q2, and the relays RL1, RL2.

Switching of the c-contact T1 to the normally-open terminal by excitation of the first relay RL1 causes current from the battery +B to flow to a ground through a fuse F1, the normally-open terminal and a common terminal of the c-contact T1 of the first relay RL1, the motor M, and a common terminal and the normally-closed terminal of the c-contact T2 of the second relay RL2. The current flows through the motor M in a direction of forward rotation to forwardly rotate the motor M.

On the other hand, switching of the c-contact T2 to the normally-open terminal by excitation of the second relay RL2 causes current from the battery +B to flow to a ground through the fuse F2, the normally-open terminal and a common terminal of the c-contact T2 of the second relay RL2, the motor M, and a common terminal and the normally-closed terminal of the c-contact T1 of the first relay RL1. The current flows through the motor M in a direction of backward rotation to backwardly rotate the motor M.

In such a construction, if an abnormal current flows through a motor M resulting from melting of relays RL1, RL2, the fuses F1 and F2 burn and a current-flow path to the motor M is interrupted. This prevents damages to the motor M but requires replacement of the burnt fuses F1, F2 for restoration.

Hence, an arrangement of FIG. 6 is considered to interrupt the current-flow path to the motor M.

Referring to FIG. 6, when a forward or backward rotation command is applied to the controller 1 including an ECU by actuation of the input portion SW including a switch, the switching control signal output terminal O1 or O2 of the controller 1 outputs an "H" switching control signal to the base of the first NPN transistor Q1 serving as the switching element for forward rotation or to the base of the second NPN transistor Q2 serving as the switching element for backward rotation, to turn on the transistor Q1 or Q2. When the first transistor Q1 turns on, current flows from the battery +B to the relay coil C1 of the first motor driving relay RL1 to excite the relay coil C1. Then the c-contact T1 of the first relay RL1 is switched from the normally-closed terminal to the normally-open terminal. Likewise, when the second transistor Q2 turns on, current flows from the battery +B to the relay coil C2 of the second motor driving relay RL2 to excite the relay coil C2. Then the c-contact T2 of the second relay RL2 is switched from the normally-closed terminal to the normally-open terminal.

At this time, the motor driving portion 2 for driving the motor M is formed by the transistors Q1, Q2 and the relays RL1, RL2.

Switching of the c-contact T1 to the normally-open terminal by excitation of the first relay RL1 causes current from the battery +B to flow to the ground through the normally-open terminal and common terminal of the c-contact T1 of the first relay RL1, the motor M, and the common terminal and normally-closed terminal of the c-contact T2 of the second relay RL2. The current flows through the motor M in the direction of forward rotation to forwardly rotate the motor M.

Switching of the c-contact T2 to the normally-open terminal by excitation of the second relay RL2 causes current from the battery +B to flow to the ground through the normally-open terminal and common terminal of the c-contact T2 of the second relay RL2, the motor M, and the common terminal and normally-closed terminal of the c-contact T1 of the second relay RL1. The current flows though the motor M in the direction of backward rotation to backwardly rotate the motor M.

With continued reference to FIG. 6, opposite ends of the motor M are connected to detection signal input terminals I1 and I2 of the controller 1 through diodes D1 and D2, respectively. The input terminals I1 and I2 are grounded through pull-down resistors R1 and R2, respectively. The diodes D1, D2 and the resistors R1, R2 form a signal detecting portion 3. When the motor M correctly rotates in the forward direction, current from the battery +B flows to the ground through the normally-open terminal and common terminal of the c-contact T1 of the first relay RL1, an anode and a cathode of the diode D1, and the resistor R1. Then, voltage across the resistor R1 is applied to the input terminal I1 of the controller 1 in the form of an "H" detection signal, and a current flow in the direction of forward rotation is detected.

When the motor M correctly rotates in the backward direction, current from the battery +B flows to the ground through the normally-open terminal and common terminal of the c-contact T2 of the second relay RL2, an anode and a cathode of the diode D2, and the resistor R2. Then, voltage across the resistor R2 is applied to the input terminal I2 of the controller 1 in the form of an "H" detection signal, and a current flow in the direction of backward rotation is detected.

A third relay RL3 for interrupting the power supply is formed in a current-flow path between the battery +B and the motor M so as to prevent damages to the motor M when current keeps flowing through the motor M after the excitation of the relays RL1 and RL2 is released because of the occurrence of an abnormality such as melting of the relays RL1 and RL2. A cutoff control signal at a low level (referred to as "L" hereinafter) from a cutoff control signal output terminal O3 of the controller 1 causes a third NPN transistor Q3 to be switched from on to off, which in turn interrupts a current flow from the battery +B to a relay coil C3 of the third relay RL3 to turn off a relay contact T3. The turning off of the relay contact T3 interrupts the current-flow path from the battery +B to the motor M to force the motor M to stop.

Such operation will be described briefly with reference to timing charts of FIGS. 7A to 7F. When the output terminal O1 of the controller 1 goes high as shown in FIG. 7A, current is passed through the motor M in the direction of forward rotation to forwardly rotate the motor M as shown in FIG. 7F. At this time, the input terminal I1 of the controller 1 goes high as shown in FIG. 7C. A current flow through the motor M in the direction of forward rotation is detected.

On the other hand, when the output terminal O2 of the controller 1 goes high as shown in FIG. 7B, current is passed through the motor M in the direction of backward rotation to backwardly rotate the motor M as shown in FIG. 7F. At this time, the input terminal I2 of the controller 1 goes high as shown in FIG. 7D. A current flow through the motor M in the direction of backward rotation is detected.

During the correct forward and backward rotations of the motor M, the output terminal O3 of the controller 1 is held high as shown in FIG. 7E and the third relay RL3 is kept excited to hold the relay contact T3 in its on state. For instance, if current in the direction of forward rotation keeps flowing through the motor M and the motor M continues rotating in the forward direction as shown in FIG. 7F after the output terminal O1 of the controller 1 is switched from H to L as shown in FIG. 7A because of the occurrence of an abnormality such as melting of the first relay RL1, the continuous application of the "H" signal to the input terminal I1 as shown in FIG. 7C permits the controller 1 to immediately detect the abnormality occurrence in the first relay RL1, and then the output terminal O3 is changed to L as shown in FIG. 7E. This releases the excitation of the third relay RL3 to turn off the relay contact T3. Thus current through the motor M is interrupted and the motor M is forced to stop as shown in FIG. 7F.

In the above stated arrangement, however, the transistor Q3 and the third relay RL3 are required to force the motor M to stop when the motor driving relays RL1 and RL2 are abnormal. This has added to the number of components, complexity of construction, and costs.

SUMMARY OF THE INVENTION

The present invention is intended for a device for detecting an abnormality in relays for driving a motor including an automotive door lock motor, an automotive power window motor, and an automotive sun roof motor. According to the present invention, the device comprises: a power supply; a motor driving portion including a first switching element for forward rotation, a second switching element for backward rotation, a first motor driving relay for forward rotation operated in response to turning-on of the first switching element, and a second motor driving relay for backward rotation operated in response to turning-on of the second switching element, the motor driving portion passing current from the power supply through the motor in directions of the forward and backward rotations by operation of the first and second relays, respectively, to drive the motor; an input portion for providing a forward rotation command and a backward rotation command; a controller for outputting a switching control signal to the first and second switching elements in response to the forward and backward rotation commands, respectively; and a signal detecting portion for detecting current through the motor to output a detection signal to the controller, wherein the controller senses a current flow through the motor when the first and second switching elements are off on the basis of the detection signal to detect an abnormality in the motor driving relays, and the controller turns on the first and second switching elements by outputting the switching control signal to the first and second switching elements to provide the same potential across the motor.

As above stated, if current flows through the motor even though the switching elements are off resulting from the abnormality such as melting of the motor driving relays, the controller provides the same potential across the motor by turning on the switching elements of the motor driving portion, thereby to reliably stop the motor. Therefore, the motor is stopped under abnormal conditions of the relays by a simplified, less costly construction without the conventionally complicated, costly construction.

It is therefore an object of the present invention to stop a motor without a conventionally complicated, costly construction if an abnormality occurs in a motor driving relay.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 7A to 7F illustrate operation of FIG. 6.

DESCRIPTION OF THE PREFERRED EMBODIMENTS

First Preferred Embodiment

Figure 1:
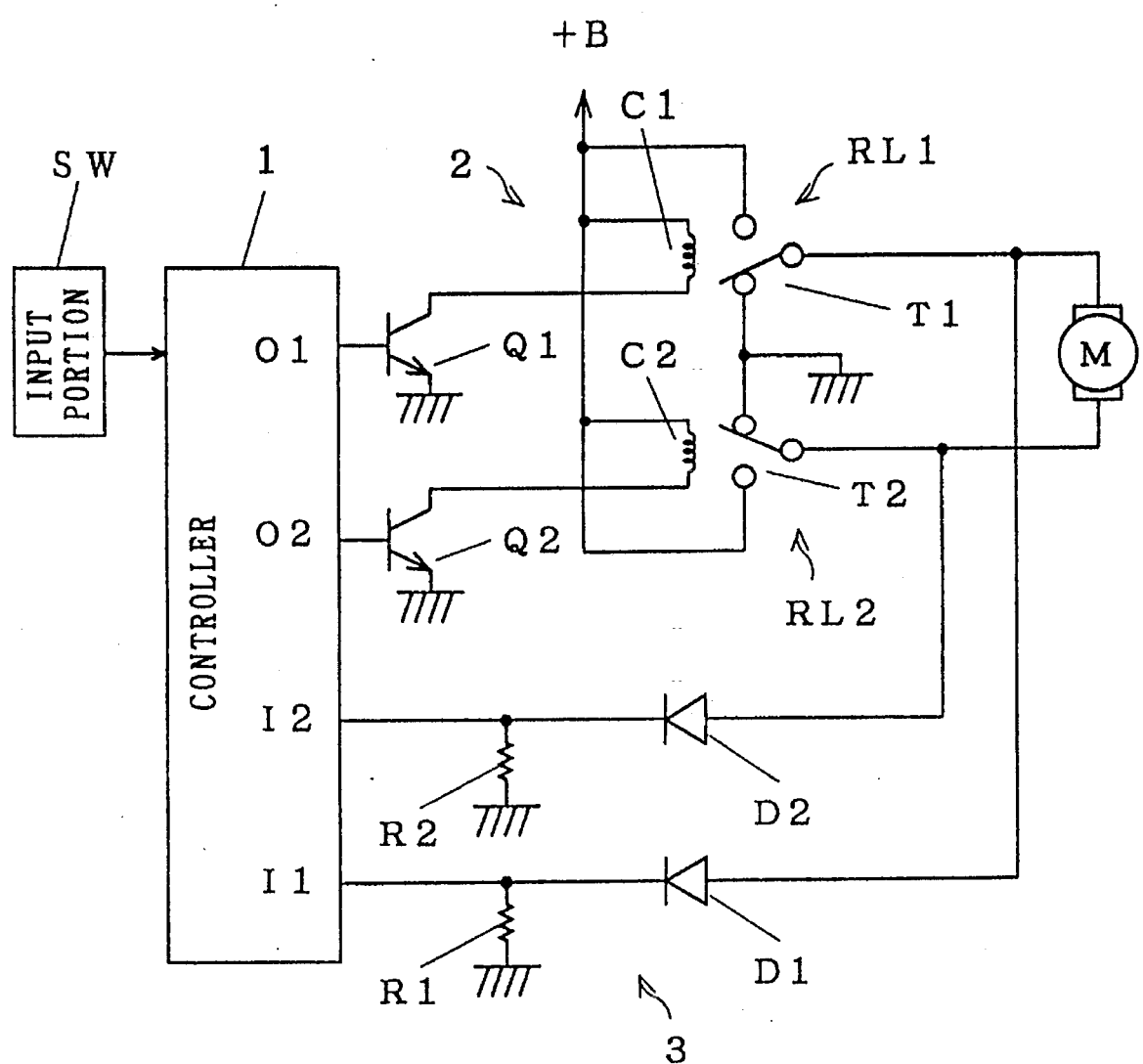
FIG. 1 is a circuit diagram of a first preferred embodiment according to the present invention.

FIG. 1 is a circuit diagram of a first preferred embodiment according to the present invention. FIGS. 2A to 2E illustrate operation of the first preferred embodiment.

Figure 6:
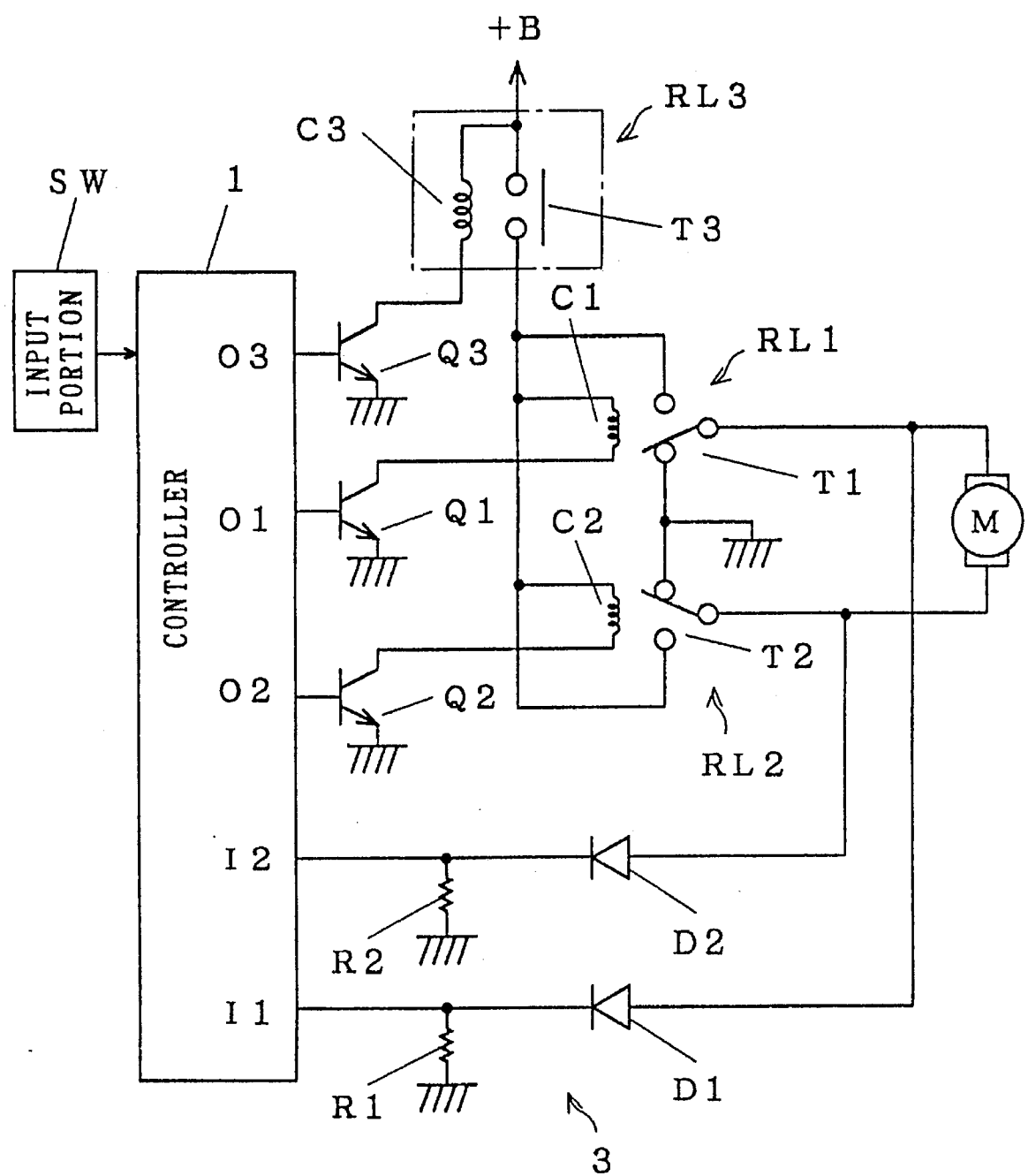
FIG. 6 is a circuit diagram of another prior art relay abnormality detecting device.

Like reference numerals are used in FIG. 1 to designate parts identical with or corresponding to those of FIG. 6. The circuit of FIG. 1 differs from that of FIG. 6 in that the third transistor Q3 and the third relay RL3 of FIG. 6 are not provided and that the controller 1 has a function to output an "H" switching control signal simultaneously at the output terminals O1 and O2 when current from the battery +B continues flowing through the motor M because of an abnormality such as melting of the relays RL1 and RL2 and an "H" detection signal is kept being applied to the input terminals I1 and I2 even though the "H" switching control signal stops being outputted to the transistors Q1 and Q2.

Operation will be discussed with reference to FIGS. 2A to 2E. The first preferred embodiment is similar in operation under normal conditions to the prior art of FIG. 6, and the description thereof will be omitted herein.

Figure 2:
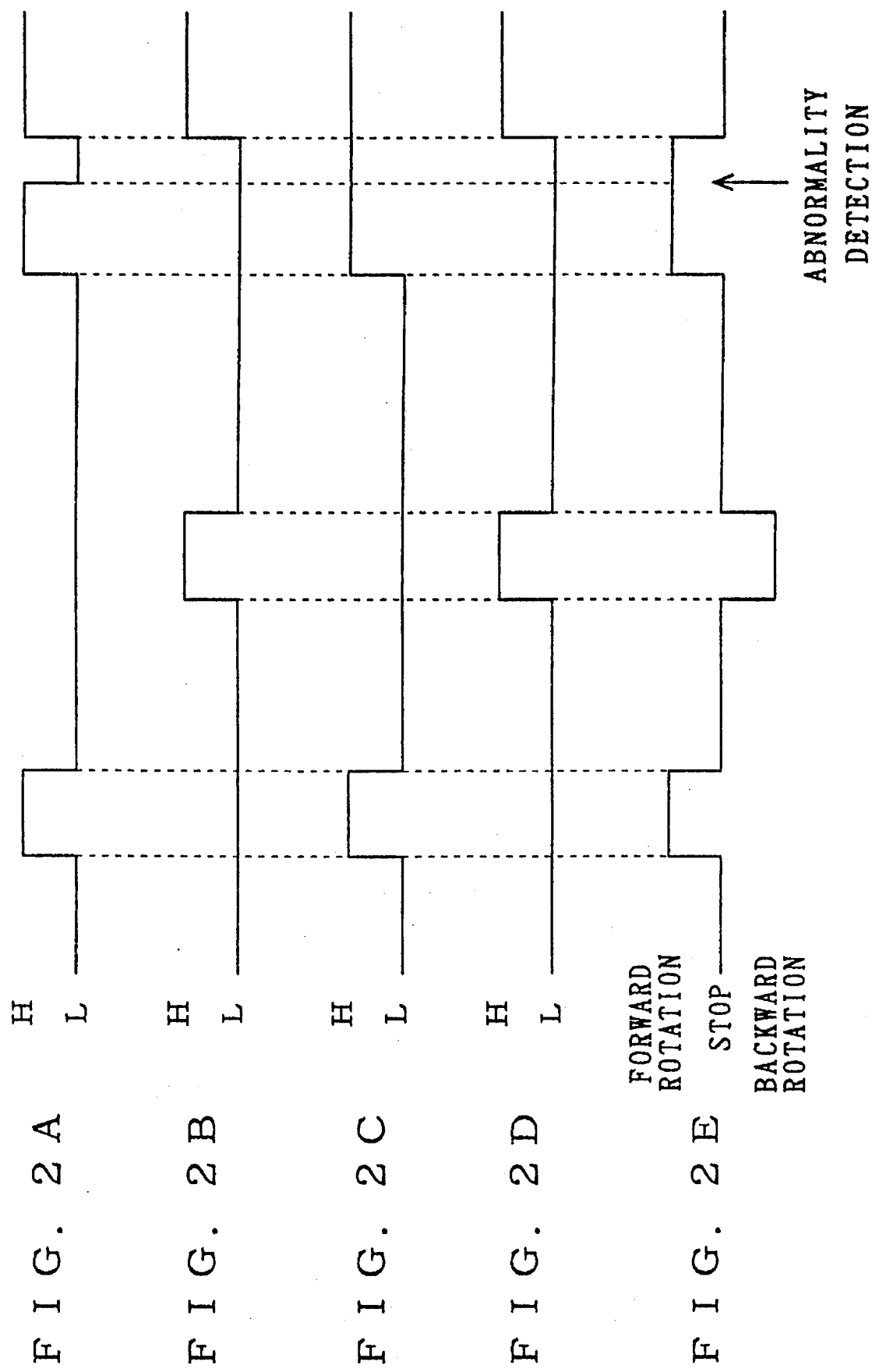
FIGS. 2A to 2E illustrate operation of the first preferred embodiment.

If current in the direction of forward rotation keeps flowing through the motor M due to an abnormality of the first relay RL1 and the motor M continues rotating in the forward direction as shown in FIG. 2E when the output terminal O1 of the controller 1 is switched from H to L as shown in FIG. 2A, the input terminal I1 of the controller 1 remains high as shown in FIG. 2C and thus the controller 1 detects the abnormality in the first relay RL1. Then both of the output terminals O1 and O2 of the controller 1 are immediately switched from L to H as shown in FIGS. 2A and 2B, and both of the transistors Q1 and Q2 turn on to excite the relays RL1 and RL2, providing the same potential across the motor M. This forces the motor M to stop as shown in FIG. 2E.

Therefore, when current keeps flowing through the motor M even though the transistors Q1 and Q2 are off resulting from an abnormality such as melting of the relays RL1 and RL2, the controller 1 causes the transistors Q1 and Q2 to turn on and, accordingly, the same potential across the motor M stops the motor M. This eliminates the need for the conventional power supply interrupting relays and transistors and facilitates the construction. Detection of the abnormality in the relays and stop of the motor M are achieved by the simplified, less expensive device.

Second Preferred Embodiment

Figure 3:
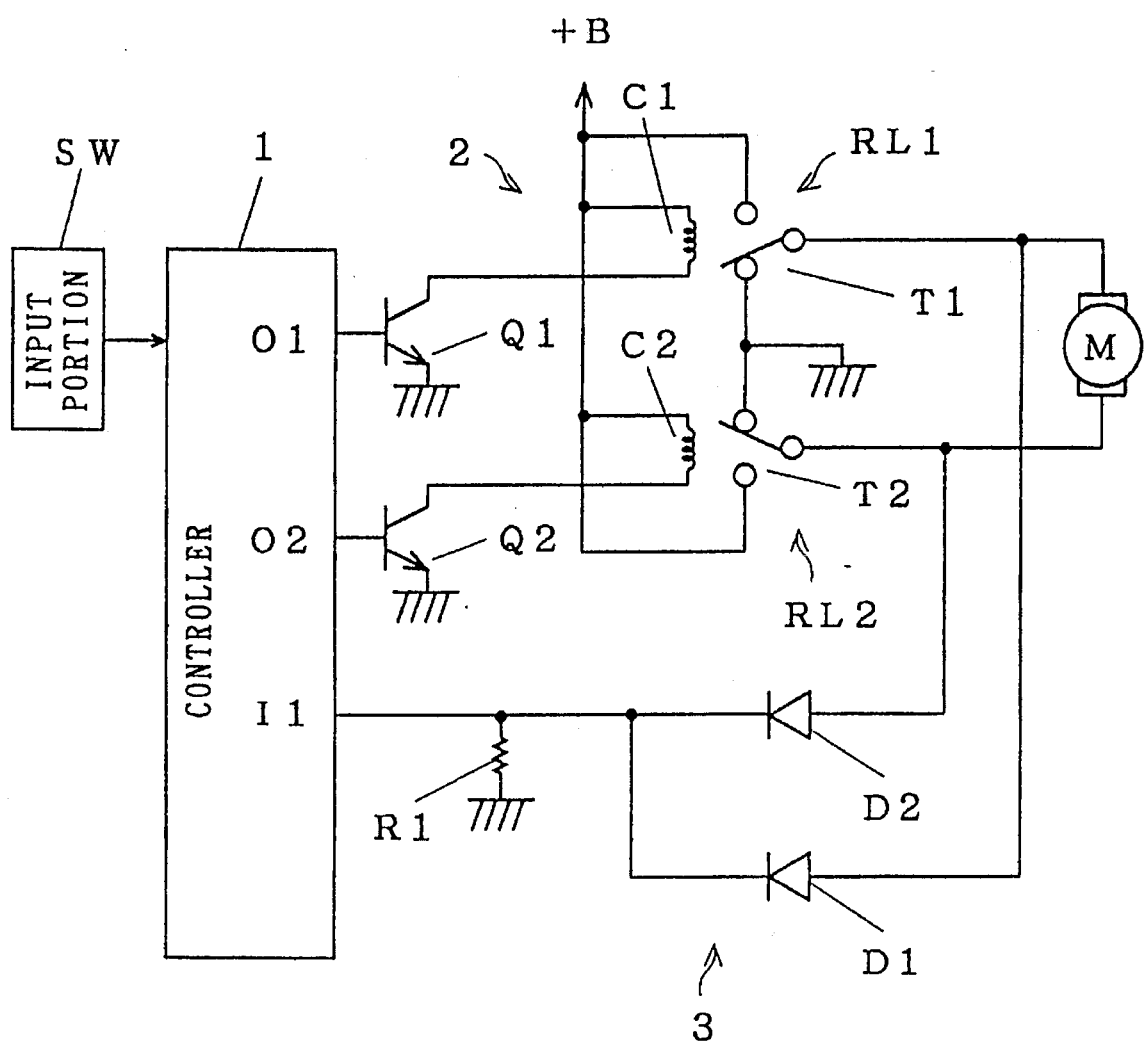
FIG. 3 is a circuit diagram of a second preferred embodiment according to the present invention.

FIG. 3 is a circuit diagram of a second preferred embodiment according to the present invention. FIGS. 4A to 4D illustrate operation of the second preferred embodiment.

Referring to FIG. 3, the second preferred embodiment differs from the first preferred embodiment in that the resistor R2 is not provided and in that the cathode of the diode D2 and the cathode of the diode D 1 are commonly connected to the detection signal input terminal I1 of the controller 1.

Figure 4:
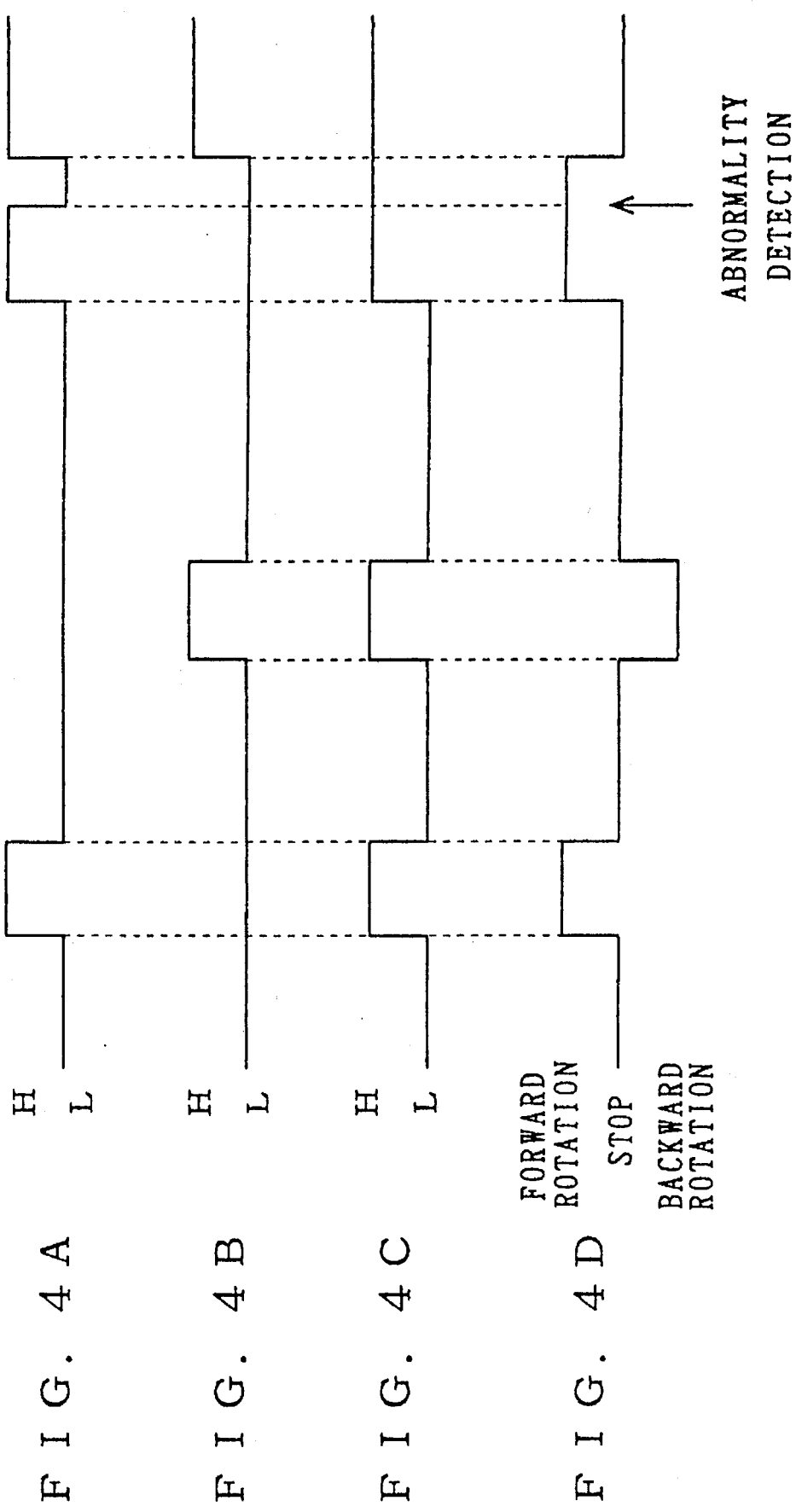
FIGS. 4A to 4D illustrate operation of the second preferred embodiment.
Figure 5:
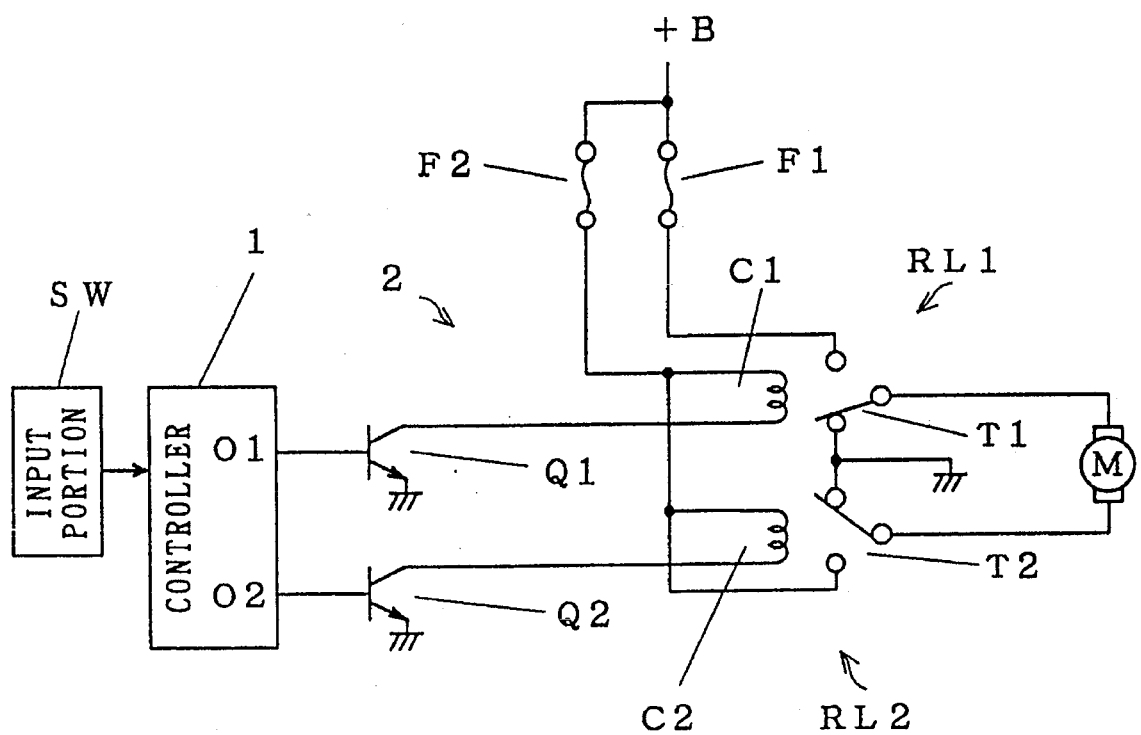
FIG. 5 is a circuit diagram of a prior art relay abnormality detecting device.

When the output terminals O1 and O2 of the controller 1 go high as shown in FIGS. 4A and 4B and the motor M correctly rotates in the forward and backward directions as shown in FIG. 4D, respectively, the input terminal I1 of the controller 1 goes high independently of the direction of rotation of the motor M as shown in FIG. 4C.

For instance, when current in the direction of forward rotation keeps flowing through the motor M due to an abnormality in the first relay RL1 and the motor M continues rotating in the forward direction as shown in FIG. 4D, the input terminal I1 of the controller 1 remains high as shown in FIG. 4C. Hence, the controller 1 detects the abnormality in the first relay RL1 in the same manner as the first preferred embodiment. Then both of the output terminals O1 and O2 of the controller 1 are immediately switched from L to H as shown in FIGS. 4A and 4B, and both of the transistors Q1 and Q2 turn on to excite the relays RL1 and RL2, providing the same potential across the motor M. This forces the motor M to stop as shown in FIG. 4D.

The second preferred embodiment provides effects similar to those of the first preferred embodiment and involves the need for fewer components than the first preferred embodiment because of the absence of the resistor R2, allowing more simplified and less costly construction.

The switching elements of the motor driving portion are not limited to the above stated transistors.

The signal detecting portion is not limited to that of the preferred embodiments.

While the invention has been shown and described in detail, the foregoing description is in all aspects illustrative and not restrictive. It is therefore understood that numerous modifications and variations can be devised without departing from the scope of the invention.

What is claimed is:

1. A device for detecting an abnormality in relays for driving a motor selectively in both forward direction and a reverse direction, comprising a power supply;

a motor driving portion including a first switching element for forward rotation, a second switching element for backward rotation, a first motor driving relay for forward rotation operated in response to turning-on of said first switching element, and a second motor driving relay for backward rotation operated in response to turning-on of said second switching element, said motor driving portion passing current from said power supply through said motor in directions of the forward and backward rotations by operation of said first and second relays, respectively, to drive said motor;

an input portion for providing a forward rotation command and a backward rotation command;

a controller for outputting a switching control signal to said first and second switching elements in response to said forward and backward rotation commands, respectively; and a signal detecting portion for detecting current through said motor to output a detection signal to said controller, wherein said controller senses said detection signal indicating a current flow through said motor when said first and second switching elements are off, thereby detecting an abnormality in said motor driving relays, and said controller turns on said first and second switching elements by outputting said switching control signal to said first and second switching elements to provide the same potential across said motor.

2. The device of claim 1 wherein said motor is an automotive door lock motor, and automotive power window motor, or an automotive sun roof motor.

3. The device of claim 1, wherein said first and second switching elements include transistors.

4. The device of claim 1, wherein said input portion includes a switch.

5. The device of claim 1, wherein said signal detecting portion includes two diodes having anodes connected respectively to opposite ends of said motor, and two resistors connected between cathodes of said two diodes and ground, respectively, and said diodes pass therethrough part of current flowing through said motor in the directions of the forward and backward rotations, and voltages across said two resistors are applied to two detection signal input terminals of said controller, respectively, in the form of said detection signal.

6. The device of claim 1, wherein said signal detecting portion includes two diodes having anodes connected respectively to opposite ends of said motor, and a resistor connected between cathodes of said diodes and ground, and said diodes pass therethrough part of current flowing through said motor in the directions of the forward and backward rotations, and a voltage across said resistor is applied to a detection signal input terminal of said controller in the form of said detection signal.

7. A device for detecting an abnormality in relays for driving a motor selectively in both forward direction and a reverse direction, consisting essentially of a power supply;

a motor driving portion including a first switching element for forward rotation, a second switching element for backward rotation, a first motor driving relay for forward rotation operated in response to turning-on of said first switching element, and a second motor driving relay for backward rotation operated in response to turning-on of said second switching element, said motor driving portion passing current from said power supply through said motor in directions of the forward and backward rotations by operation of said first and second relays, respectively, to drive said motor;

an input portion for providing a forward rotation command and a backward rotation command;

a controller for outputting a switching control signal to said first and second switching elements in response to said forward and backward rotation commands, respectively; and a signal detecting portion for detecting current through said motor to output a detection signal to said controller, wherein said controller senses said detection signal indicating a current flow through said motor when said first and second switching elements are off, thereby detecting an abnormality in said motor driving relays, and said controller turns on said first and second switching elements by outputting said switching control signal to said first and second switching elements to provide the same potential across said motor.

* * * * *